United States Patent [19]

Tahara et al.

[11] Patent Number: 5,410,105
[45] Date of Patent: Apr. 25, 1995

[54] METHOD FOR WATERPROOFING JUNCTION OF MAIN AND BRANCH WIRES AND COVER THEREFOR

[75] Inventors: Masaharu Tahara; Katsumi Hiroshima, both of Osaka; Michitaka Kinoshita; Yukio Ohashi, both of Shizuoka, all of Japan

[73] Assignees: Nitto Denko Corporation, Osaka; Yazaki Corporation, Tokyo, both of Japan

[21] Appl. No.: 124,398

[22] Filed: Sep. 21, 1993

[30] Foreign Application Priority Data

Sep. 21, 1992 [JP] Japan ................... 4-278148
May 29, 1993 [JP] Japan ................... 5-151474
Aug. 27, 1993 [JP] Japan ................... 5-235552

[51] Int. Cl.⁶ ........................................ H02G 15/113
[52] U.S. Cl. ........................................ 174/92; 156/49; 174/76; 174/138 F; 439/367; 439/457; 439/521; 439/731
[58] Field of Search ............ 174/92, 76, 88 R, 138 F; 156/49; 439/367, 457, 521, 731

[56] References Cited

U.S. PATENT DOCUMENTS

| | | | |
|---|---|---|---|
| 3,519,731 | 7/1970 | Grunbaum | 174/138 F |
| 3,683,314 | 8/1972 | Elkins | 174/138 F |
| 3,842,191 | 10/1974 | Neale, Sr. | 174/88 R |
| 4,029,896 | 6/1977 | Skinner | 174/138 F |
| 4,139,727 | 2/1979 | Kuballa | 174/68.5 |
| 4,550,220 | 10/1985 | Kitchens | 174/138 F |
| 4,795,857 | 1/1989 | McInnis | 174/138 F |
| 4,849,580 | 7/1989 | Reuter | 174/92 |
| 4,859,869 | 8/1989 | Jervis | 174/92 |
| 4,863,535 | 9/1989 | More | 156/49 |
| 5,021,611 | 6/1991 | Amano | 174/88 R |
| 5,030,798 | 7/1991 | Schilling | 174/92 |

FOREIGN PATENT DOCUMENTS

| | | | |
|---|---|---|---|
| 995315 | 8/1976 | Canada | 174/92 |
| 1751699 | 1/1956 | Germany . | |
| 3320916 | 12/1984 | Germany | 174/92 |
| 59-109075 | 7/1984 | Japan . | |

Primary Examiner—Morris H. Nimmo
Attorney, Agent, or Firm—Sughrue, Mion, Zinn, Macpeak & Seas

[57] ABSTRACT

A method for waterproofing a junction of branch wires with a main wire by enclosing the junction in a plastic cover containing a putty sealant and filling the inside of the cover with the sealant and a cover therefore are disclosed, the method comprising providing projections n and m on the inner side of cover 1 by which parallel wires b enfolded in the cover are vertically shifted or the parallel wires are not only vertically shifted but laterally spread by the projections to make enough space between adjacent wires b for letting the putty sealant in.

12 Claims, 6 Drawing Sheets

METHOD FOR WATERPROOFING JUNCTION OF MAIN AND BRANCH WIRES AND COVER THEREFOR

FIELD OF THE INVENTION

This invention relates to a method for waterproofing a junction of branch wires with the main wire, and to a cover which can be used for carrying out the method.

BACKGROUND OF THE INVENTION

It is known that waterproofing of a junction of low-voltage insulated wires is achieved by enfolding the wire junction in a cover containing therein a putty sealant, compressing the putty sealant between the upper and lower halves of the cover to spread the putty sealant within the cover.

However, where branch wires paralleling the main are connected to the main, the paralleling wires are packed tight in the cover and form gorges that the putty sealant cannot easily enter, resulting in a failure of satisfactory waterproofing.

In order to overcome the above disadvantage, it has been proposed to provide projections on the inner surfaces of the upper and lower halves of a cover so that the projections may wedge into the paralleling wires to spread the wires laterally (i.e., in the width direction of the cover) to form enough space for receiving a putty sealant (see Japanese Utility Model Appln. No. 59-109075). According to this method, however, since the wires are laterally spread, the cover and, attendantly, the wire junction must be larger in dimension.

SUMMARY OF THE INVENTION

An object of the present invention is to provide a method for waterproofing a junction of branch wires with the main (hereinafter simply referred to as a wire junction) by using a cover containing a putty sealant, in which complete waterproofing with the putty sealant can be achieved while minimizing the increase of the dimension of the junction.

Another object of the present invention is to provide a cover which can be used in carrying out the above waterproofing method.

The present invention relates to a method for waterproofing a wire junction comprising enfolding the junction in a cover while compressing a putty sealant in the cover to fill the inside of the cover with the sealant, in which the cover has provided on the inner side thereof projections so that parallel wires enfolded in the cover are vertically shifted or not only vertically shifted but laterally spread by the projections to leave enough space between adjacent wires for letting the putty sealant in.

According to the present invention, space can be formed between adjacent parallel wires by vertically shifting the wires. As compared with space formation only by a lateral spread of the parallel wires, there is no need to increase the width of the cover, and the junction thus has a reduced dimension.

DETAILED DESCRIPTION OF THE PREFERRED EMBODIMENTS

Preferred embodiments of the present invention will be illustrated by referring to the accompanying drawings.

Figure 1:
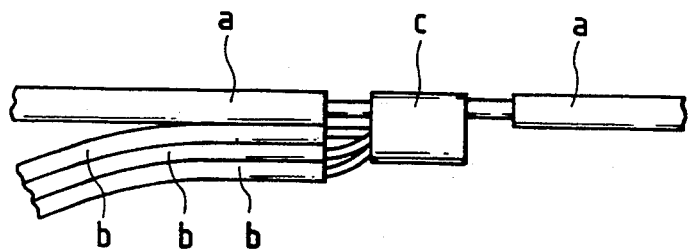
FIG. 1 shows a wire junction to be waterproofed by the present invention.

FIG. 1 shows a wire junction, an object of waterproofing according to the present invention. The wire junctions to be waterproofed by the present invention preferably include those in which each wire has a relatively small diameter and more than one branch wire is connected to the main. The wire junction shown in FIG. 1 is comprised of a main insulated wire a with its middle part bared and a plurality of branch insulated wires b connected to the bare main wire by means of fitment c. A single wire is on the right-hand side of fitment c, and parallel wires are on the left-hand side.

Figure 2A:
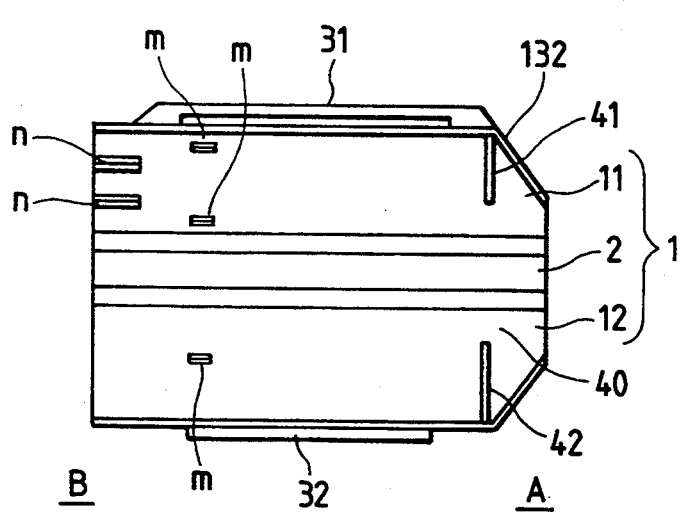
FIG. 2(a) is a plan view of an embodiment of the cover for a wire junction according to the present invention.

FIG. 2(a) is a plan view of one embodiment of a plastic cover which can be used in the present invention in its developed state. 11 and 12 are each a complementary half of cover 1 joined via hinge 2. At one end of cover 1 indicated by A from which a single wire is led out, there are provided partitioning walls 41 and 42 each having groove 40 into which a single wire is fit. On fastening two halves 11 and 12, these partitioning walls form a diaphragm for blocking a putty sealant while making a hole through which a single wire is led out as hereinafter described. Cover 1 has tapered tip 132 at end A so that the junction may not catch on other objects when the single wire is pulled at. At the other end of cover 1, indicated by B, from which parallel wires are led out, there are provided projections n each of which is to wedge between parallel wires, and projections m each of which is to thrust the parallel wires from the upside and the downside alternately. The height of projections m is less than that of projections n. Fastening projection 31 is provided on the side of one half of cover 1, and catch therefor 32 is provided on the side of the other half.

Figure 2B:
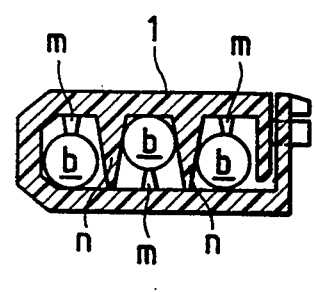
FIG. 2(b) is a cross section of the cover of FIG. 2(a) in its fastened state as enfolding a wire junction therein.

When a wire junction is enfolded in cover 1, the parallel wires b are laterally spread by projections n while being vertically shifted as shown in FIG. 2(b).

Figure 3A:
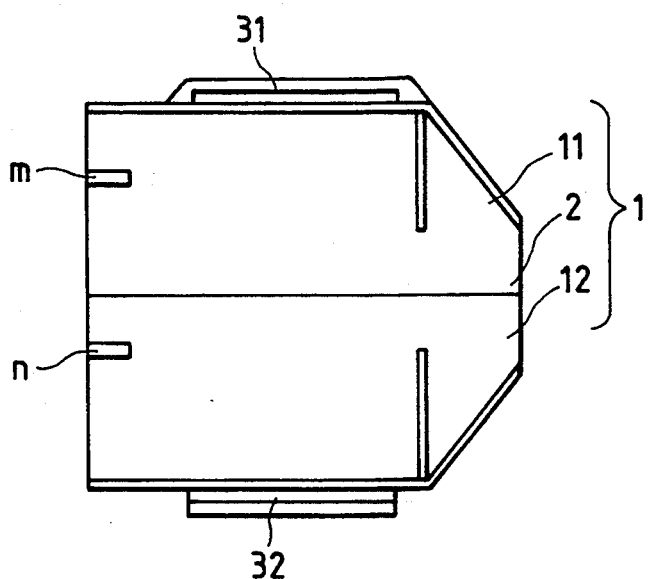
FIG. 3(a) is a plan view of another embodiment of the cover for a wire junction according to the present invention.
Figure 3B:
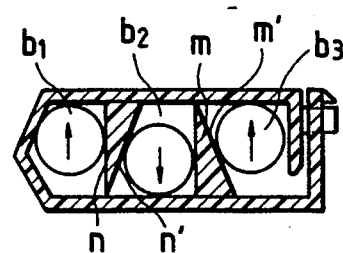
FIG. 3(b) is a cross section of the cover of FIG. 3(a) in its fastened state as enfolding a wire junction therein.

FIG. 3(a) illustrates a plan view of another embodiment of the plastic cover according to the present invention in its developed state. In this embodiment, projection n and m each have a right triangle cross section in such a manner that when cover 1 is folded into two and fastened, one side of projection n, indicated by n' and that of adjacent projection m, indicated by m', are tapered to reverse directions as shown in FIG. 3(b). In this case, central wire $b_2$ is pushed downward while wire $b_3$ on the right-hand side is pushed upward thereby achieving vertical shifting of wires $b_2$ and $b_3$. Central wire $b_2$ and left wire $b_1$ are also relatively shifted in the vertical direction as a result of the downward shift of central wire $b_2$.

Figure 4A:
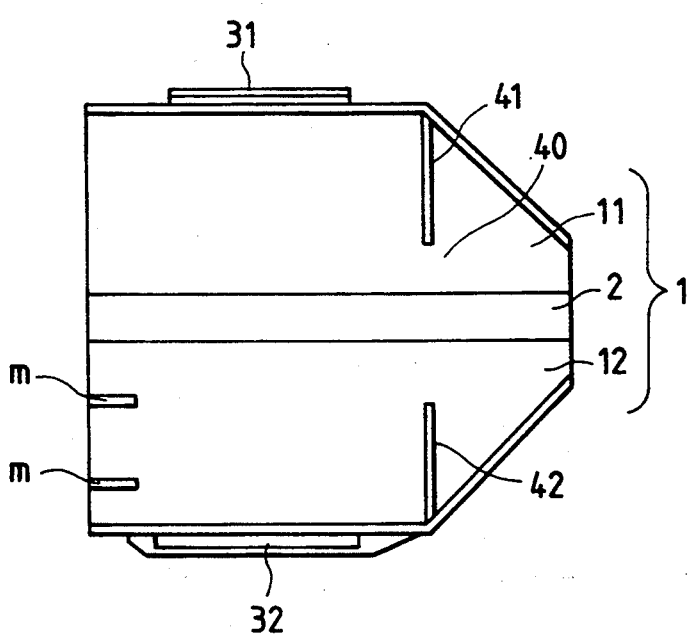
FIG. 4(a) is a plan view of still another embodiment of the cover for a wire junction according to the present invention.
Figure 4B:
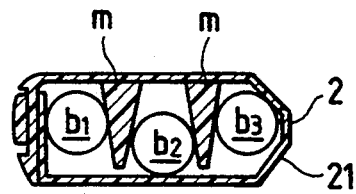
FIG. 4(b) is a cross section of the cover of FIG. 4(a) in its fastened state as enfolding a wire junction therein.

FIG. 4(a) is a plan view of a further embodiment of the plastic cover according to the present invention in its developed state. In this embodiment, the width of hinge 2 is set so that when cover 1 is folded and fastened, as shown in FIG. 4(b), tapering 21 on each side of hinge 2 may function as a projection against wire $b_3$ contacting with the inner surface of hinge 2. The width of hinge 2 is usually ¼ the height of a fastened cover. Thus, the parallel wires are in contact with projections in different ways and, as a result, a shearing action in the vertical direction is exerted on the parallel wires thereby to shift the parallel wires up and down.

Figure 4C:
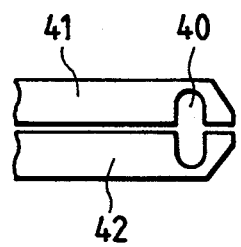
FIG. 4(c) is a side view of partitioning walls in the cover of FIG. 4(a) in its fastened state making a hole through which a single wire is led out from one end of a wire junction.

Further, as shown in FIG. 4(c), grooves 40 of partitioning walls 41 and 42 are designed so that they may form a vertically oblong hole in which a single wire is given free play in the vertical direction. As a result, the force imposed on parallel wires $b_1$ to $b_3$ by projections m is prevented from traveling from the single wire passing on the grooves 40 directly to the body of cover 1. Deformation of the cover can therefor be avoided even if the wall thickness of cover 1 is reduced.

Figure 5A:
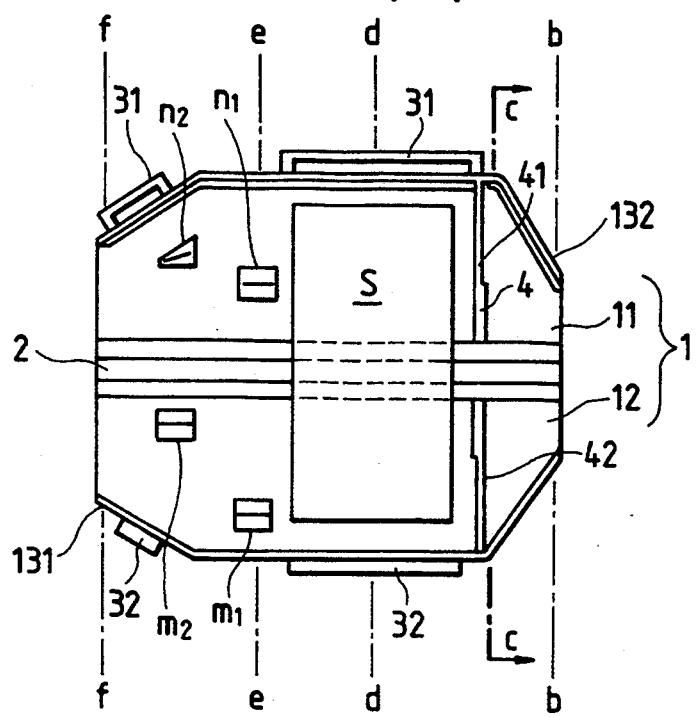
FIG. 5(a) is a further embodiment of the cover for a wire junction according to the present invention.
Figure 5B:
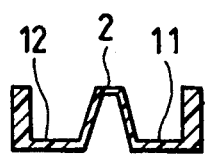
FIGS. 5(b) to (f) are each a cross section of the cover of FIG. 5(a) along b—b line, c—c line, d—d line, e—e line or f—f line, respectively.

FIG. 5(a) illustrates a still further embodiment of the plastic cover of the present invention. FIGS. 5(b), (c), (d), (e), and (f) are cross sections of cover 1 along b—b line, c—c line, d—d line, e—e line, and f—f line, respectively. In this embodiment, cover 1 in its fastened state has both ends thereof tapered as shown by symbols 132 and 131, and two pairs of fasteners 31 and 32 are provided. Projections $n_1$ and $n_2$ are provided on the inner side of upper half 11, and projections $m_1$ and $m_2$ are on lower half 12. Projection $n_1$ of upper half 11 and projection $m_1$ of lower half 12 are aligned on the same line along the width direction of cover 1 (the direction perpendicular to the parallel wires) at such positions that they may not face each other when the two halves are fastened. Similarly, projection $n_2$ of upper half 11 and projection $m_2$ of lower half 12 are on the same line which is parallel to the line of projections $n_1$ and $m_1$ at such positions that they may not face each other when the two halves are fastened. None of these projections are on the same line in the longitudinal direction of cover 1 in its fastened state. That is, none of them are at the same position in the width direction of cover 1.

On one end of cover 1 from which a single wire is led out is provided partitioning wall 4, and groove 40 of the wall is for receiving a single wire. The position of partitioning wall 41 provided on upper half 11 and that of partitioning wall 42 on lower half 12 are slightly shifted from each other in the longitudinal direction so that, when cover 1 is folded and fastened, walls 41 and 42 overlap to form a diaphragm while making a hole through which a single wire passes. S is a putty sealant.

Figure 5C:
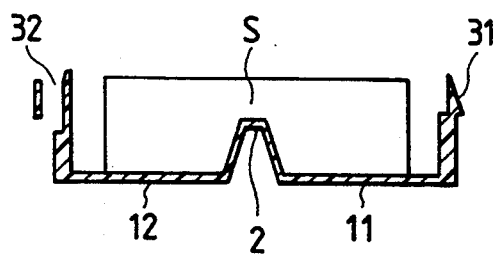
Figure 5D:
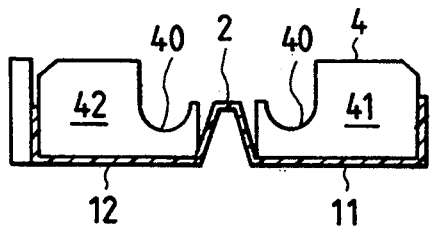
Figure 5E:
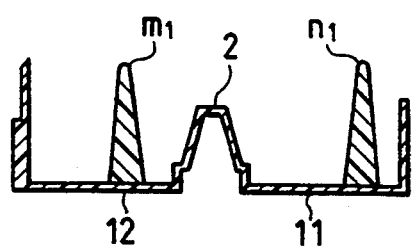
Figure 5F:
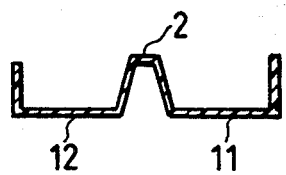
Figure 6A:
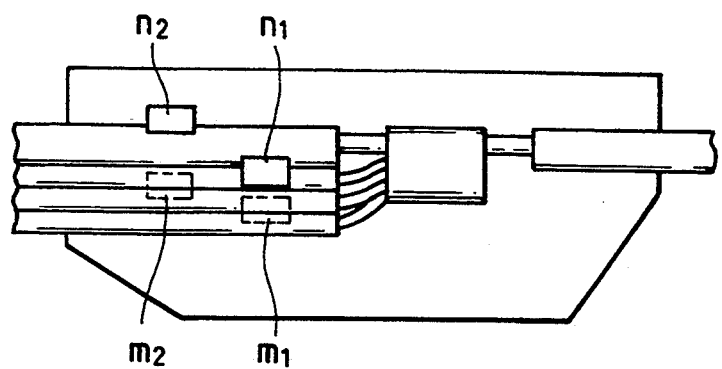
FIGS. 6(a) and (b) each illustrate the state of parallel wires enfolded in the cover of FIGS. 5.
Figure 6B:
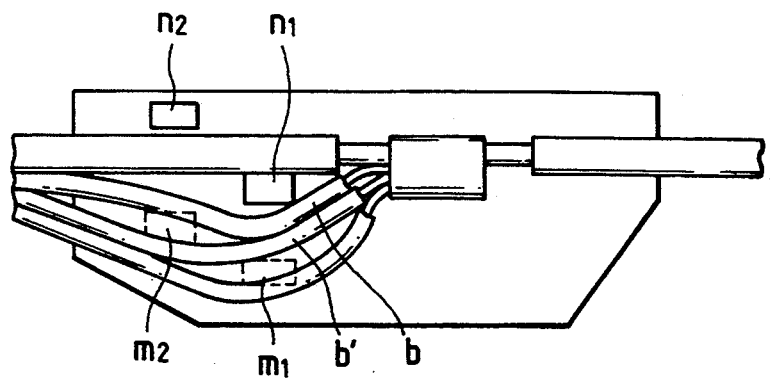

FIGS. 6(a) and (b) each show the usage of the cover of FIG. 5 with a wire junction being enfolded therein. In the case of FIG. 6(a), the wires pushed by the projections on the upper half of the cover bend down whereas the wires pushed by the projections on the lower half of the cover bend upward. Since the position of contact with the projection differs among the wires, the shape of the bend differs among the parallel wires thereby to form space between each two adjacent wires. In the case of FIG. 6(b), projections $n_1$ and $m_1$ on the same line wedge between the parallel wires to makes wires b and b' tight, but at the same time, projection $m_2$ on the other line wedges between wires b and b' to spread them laterally. Accordingly, sufficient space can be formed between parallel wires b and b'.

Waterproofing of a wire junction according to the present invention is achieved by adhering putty sealant S, e.g., a sealing compound mainly comprising unvulcanized rubber, to the middle part of the inner side of the cover in its developed state as shown, for example, in FIGS. 5(a) and 5(c), and folding the cover with a wire junction being interposed therebetween. Upon being enfolded in the cover, the parallel wires are not only spread laterally but vertically shifted by the projections provided on the inner side of the cover to leave sufficient space among themselves.

The thickness (e) of the putty sealant on a cover in its developed state is more than a half the thickness (d) of the cover in its folded and fastened state, i.e., $d/2 < e$, so that the putty sealant is compressed on folding the cover. The compressed sealant flows toward the projections, and the open space among the parallel wires is thus filled with the sealant. On the other hand, the flow of the sealant toward the opposite end, i.e., the outlet for a single wire, is blocked by the diaphragm of partitioning walls, and the diaphragm serves as a back-pressure plate to ensure the flow of the sealant toward the parallel wires and to accelerate sufficient filling of the space with the sealant.

Figure 7A:
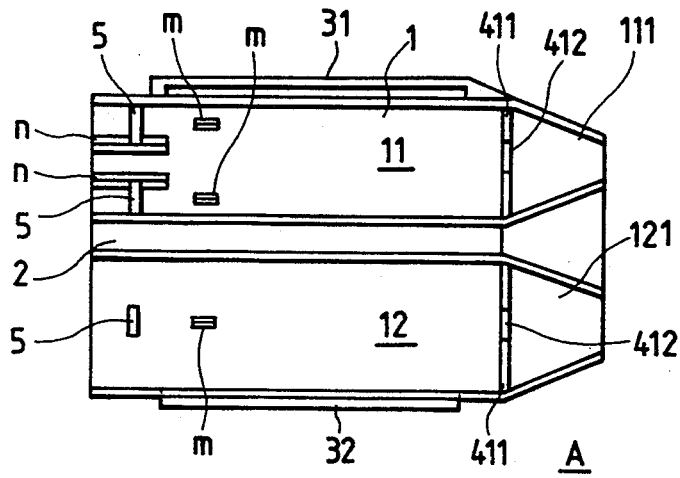
FIG. 7(a) is a still further embodiment of the cover for a wire junction according to the present invention.
Figure 7B:
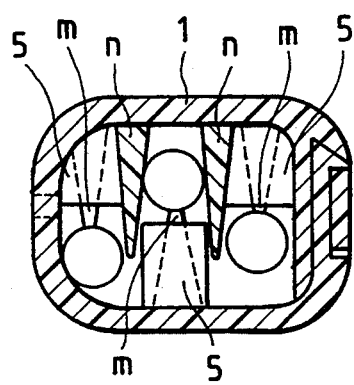
FIG. 7(b) is a cross section of the cover of FIG. 7(a) in its fastened state as enclosing a wire junction therein.

If desired, a diaphragm may be provided at the end of the cover from which parallel wires are led out so that overflow of the putty sealant from that end may be prevented while increasing the inner pressure of the sealant thereby filling the space among the parallel wires with the sealant with higher reliability. For example, as shown in FIGS. 7(a) and 7(b), projections 5 functioning as the above-mentioned diaphragm are provided at the positions corresponding to the space formed by projections n and m. The covers shown in FIGS. 3 to 6 may also be provided with such projections functioning as diaphragms as in FIGS. 7(a) and (b).

While the end portion of the cover of FIG. 7a, indicated by A, formed by upper and lower halves 11 and 12, from which a single wire is led out, is tapered on both sides thereof, end portion A may be tapered on only one side thereof as in the cover shown in FIG.

Figure 7C:
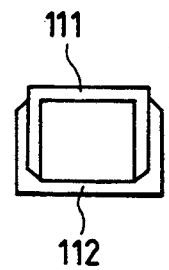
FIG. 7(c) illustrates the view of one end of the cover of FIG. 7(a) in its fastened state from which a single wire is led out.

2(a). In the cover of FIG. 7, tips 111 and 121 of upper half 11 and lower half 12 engage with each other so as to provide the double wall structure as shown in FIG. 7(c). By providing the double wall structure formed by the tips 111 and 121, a mechanical strength of the cover is increased and it is possible to prevent the sealant in the cover from leaking surely. 411 in FIG. 7(a) is a partitioning wall having groove 412 for receiving a single wire.

In addition, the end portion of the cover of FIG. 7, indicated by A, formed by upper and lower halves 11 and 12, from which a single wire is led out, is tapered, so that a handling ability of the pulling operation can be improved and a space for mounting the cover can be decreased.

Figure 8A:
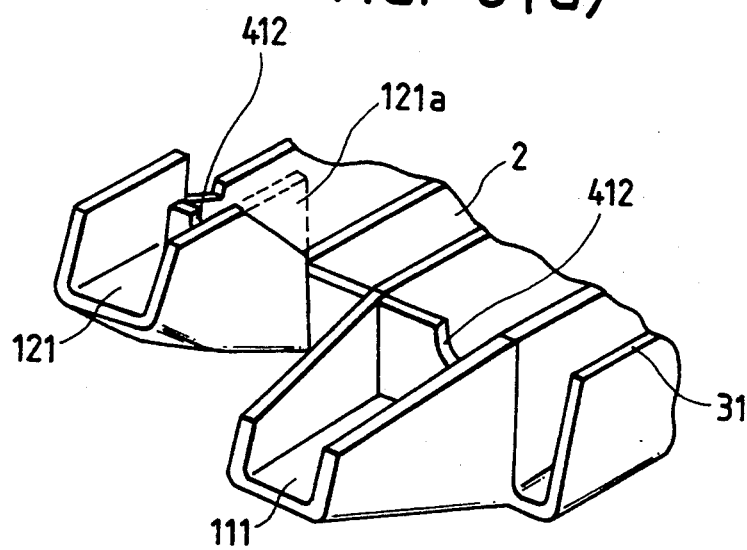
FIG. 8(a) is a perspective view of a modification of the cover for a wire junction shown in FIG. 7.
Figure 8B:
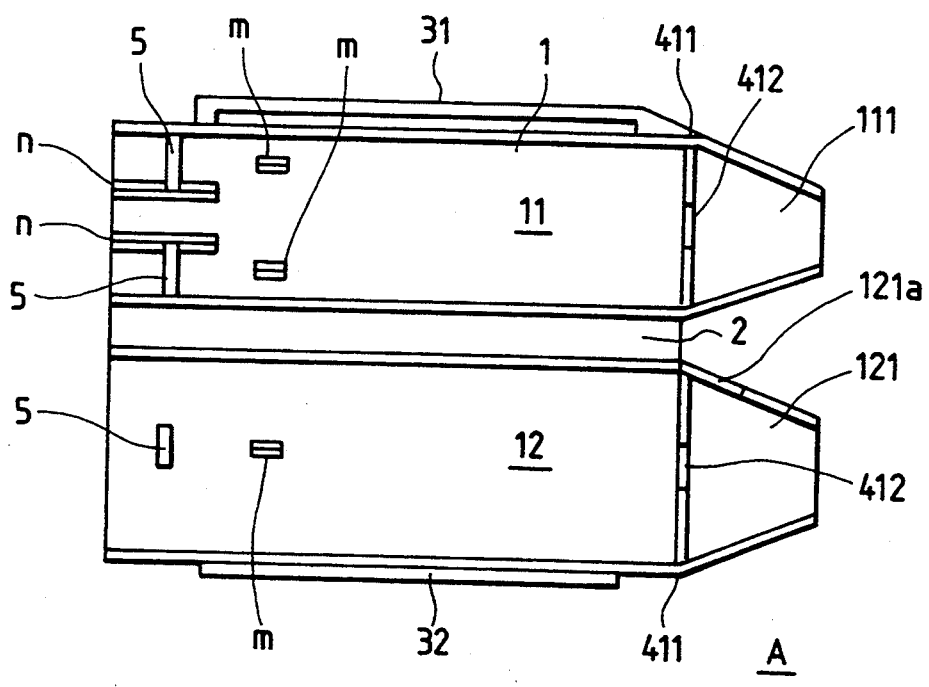
FIG. 8(b) is a plan view of the modification shown in FIG. 8(a).

Further, as shown in FIGS. 8(a) and 8(b), an inner wall of the tip 121, which is closer to the hinge 2, may be provided with a cutout portion 121a at the higher corner thereof in such a manner that a closing/assembling operation between the upper and lower halves 11 and 12 is not interrupted by contacting the higher corner of the inner wall of the tip 121 with an inner wall of the tip 111. By providing the cutout portion 121a, it is possible to conduct the closing/assembling operation between the upper and lower halves 11 and 12 via the hinge 2 smoothly.

According to the above-described waterproofing method, the cover undergoes deformation under an elastic stress due to the resistance of the compressed putty sealant on being folded and fastened. The cover is restored to its original shape with time while maintaining the equilibrium between the stress of the cover and the stress of the putty sealant. Finally, the flow front of the putty sealant reaches both ends of the cover (or diaphragms), and the stress of the cover becomes almost zero. Filling of the sealant into the space among the parallel wires has been completed before the above state is reached.

In order to ensure complete filling, it is effective to sufficiently increase the initial compression ratio of the putty sealant. The initial compression ratio of the sealant depends on not only the ratio of the total thickness of the sealant applied to the upper and lower halves of the cover (2e) to the thickness (d) of the cover in its folded and fastened state, i.e., 2 e/d ($>$1), but also the volume of the wire junction. However, in cases of using wires having a small diameter, the compression ratio of the sealant is substantially decided by the ratio 2 e/d. In these cases, the ratio 2 e/d is preferably 2 or more.

In carrying out waterproofing of a wire junction according to the present invention, a putty sealant in the form of a sheet may previously be wound around the junction, on which the cover of the present invention is then put and fastened. In this case, too, even if the volume of the wire junction is small, the compression ratio of the sealant can be increased sufficiently by increasing the volume of the sealant applied.

Figure 9A:
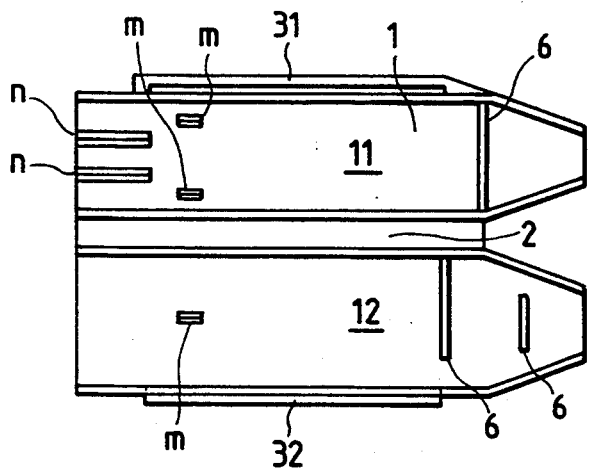
FIG. 9(a) is a yet further embodiment of the cover for a wire junction according to the present invention.
Figure 9B:
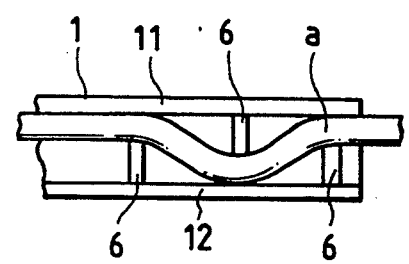
FIG. 9(b) illustrates the curving single wire at one end of the cover of FIG. 9(a) in its fastened state.

According to the foregoing preferred embodiments, even if the cover is moved in its longitudinal direction, the wires are prevented from coming off the cover because either of the projection and the diagram (partitioning wall) catches on fitment c. In particular, where a plurality of projections 6 are provided at the end from which a single wire is led out on upper half 11 and lower half 12 alternately at some intervals in the longitudinal direction as shown in FIG. 9(a), single wire a is vertically thrust by projections 6 on being enfolded and is curved as shown in FIG. 9(b). Thus, cover 1 is fixed to single wire a firmly to ensure prevention of the wire junction from coming off cover 1. The above-mentioned projections for curving a single wire at the end of a cover may also be provided in all the other embodiments shown in FIGS. 3 to 7.

While the end portion of cover 1 shown in FIG. 9 from which a single wire is led out is tapered from both sides thereof similarly to the cover of FIG. 7, the end portion may of course be tapered from only one side thereof as in the cover of FIG. 2(a).

While according to the above-described embodiments all the branch wires are led out from only one end of the cover, it is possible to lead out branch wires from both ends of the cover. In this case, the partitioning walls or projections for curving a single wire should be replaced with projections for laterally spreading parallel wires and those for vertically shifting parallel wires within the cover as provided at the other end.

Further, while the upper and lower halves of the covers according to the foregoing embodiments are integrally molded with hinge 2 therebetween, it is possible to separately prepare the two halves each having fasteners on both sides thereof, and the two halves are fastened with a wire junction being interposed therebetween.

According to the present invention, even if a plurality of branch wires are connected to the main, enough space can be surely formed among parallel wires within the cover for letting a sealant flow in thereby to accomplish watertight waterproofing.

Moreover, since the parallel wires are vertically shifted in the cover, the degree of lateral spreading of wires can be minimized so that the necessary width of the cover may be minimized, i.e., the size of the wire junction is reduced.

While the invention has been described in detail and with reference to specific examples thereof, it will be apparent to one skilled in the art that various changes and modifications can be made therein without departing from the spirit and scope thereof.

What is claimed is:

1. A method for waterproofing a junction of branch wires with a main wire comprising the steps of:
providing a cover having projections on the inside of the cover, for enclosing the junction;
filling the inside of the cover with a putty sealant; and
enfolding the cover around the junction and compressing the putty sealant to surround the junction;
wherein the projections are provided on the inner side of said cover in such a manner that parallel wires enfolded in the cover are vertically shifted by said projections to leave enough space between adjacent wires for letting said putty sealant in.

2. A method for waterproofing a junction of branch wires with a main wire according to claim 1, wherein said projections are provided in such a manner that parallel wires enfolded in the cover are vertically shifted and also laterally spread by said projections.

3. A method for waterproofing a junction of branch wires with a main wire according to claim 2, wherein said lateral spreading and vertical shifting of the parallel wires are effected by utilizing the inner surface of a hinge of the cover as well as said projections provided on the inner side of the cover.

4. A cover for enclosing a junction of substantially parallel wires while compressing a putty sealant in the cover to fill the inside of the cover with the sealant, comprising:

a housing including first and second portions which are foldable to receive the wires therebetween; and projections protruding from an inner side of at least one of said first and second portions in such a manner that substantially parallel wires enfolded between said portions are vertically shifted by said projections to leave enough space between adjacent wires for letting said putty sealant in.

5. A cover according to claim 4, wherein said projections are provided in such a manner that parallel wires enfolded in the cover are vertically shifted and also laterally spread by said projections.

6. A cover according to claim 5, wherein said projections are provided so as to laterally spread parallel wires enfolded therein.

7. A cover according to claim 6, in which at least one of said projections has at least one side thereof tapered with the direction of the tapering of one projection being opposite to that of the adjacent projection.

8. A cover according to claim 5, further comprising a hinge between said first and second portions of said housing, wherein the inner surface of said hinge along with said projections laterally spread and vertically shift the parallel wires.

9. A cover according to claim 4, wherein said projections project inwardly from both of said first and second portions of the cover at positions shifted in the width direction of the cover so that opposing projections are offset from each other.

10. A cover according to claim 4, in which said projections are aligned in a plurality of lines perpendicular to the longitudinal direction of the cover at prescribed line intervals, with the positions of all the projections being different in the width direction of the cover.

11. A cover according to any one of claims 4 through 10, further comprising a diaphragm for blocking said putty sealant from overflowing to the end of the cover opposite to the direction toward the space formed among the parallel wires.

12. A cover according to claim 4, further comprising at least one rib extending inwardly from each of said first and second portions of said housing such that when said housing is folded, said ribs cause at least one of said wires to curve, thereby securing said wires.

* * * * *